United States Patent [19]
O'Neill

[11] Patent Number: 6,145,555
[45] Date of Patent: Nov. 14, 2000

[54] CUTTING TOOL AND METHOD OF USE FOR CATCHING CHIPS AND DEBRIS DURING TURNING OPERATIONS

[76] Inventor: John D. O'Neill, 71 Alger Dr., Rochester, N.Y. 14624-4842

[21] Appl. No.: 09/034,217

[22] Filed: Mar. 4, 1998

[51] Int. Cl.[7] .............................. B27C 7/02; B23B 25/00
[52] U.S. Cl. .................................. 142/56; 82/901; 142/1; 142/55
[58] Field of Search .................................. 142/1, 55, 56; 82/52, 152, 173, 901; 30/124, 133; 408/58, 67

[56] References Cited

U.S. PATENT DOCUMENTS

| | | | |
|---|---|---|---|
| 622,461 | 4/1899 | Glarden-Jacquet et al. | 142/56 |
| 646,257 | 3/1900 | Berger | 142/56 |
| 2,061,581 | 11/1936 | Lippincott | 82/901 |
| 3,512,561 | 5/1970 | Cortez | 142/55 |
| 4,414,743 | 11/1983 | Pioch et al. | 30/124 |
| 5,688,082 | 11/1997 | Richardson | 408/67 |

FOREIGN PATENT DOCUMENTS

| | | | |
|---|---|---|---|
| 92007 | 4/1989 | Japan | 82/901 |
| 153246 | 6/1989 | Japan | 82/901 |
| 321405 | 3/1972 | U.S.S.R. | 82/52 |

*Primary Examiner*—Steven C. Bishop
*Attorney, Agent, or Firm*—David J. O'Neill

[57] ABSTRACT

A cutting tool for cutting a work piece and catching debris during turning operations is described herein. The cutting tool comprises a tubular cutting member having first and second ends, the first end having a sharpened edge, and a debris receiving means connected to the second end. The tubular cutting member may have a number of different cross-sections providing a number of different cutting tool configurations for use in turning operations. The debris receiving means may further include a flexible hose having a first hose end and a second hose end, wherein the first hose end is connected to the second end of said tubular cutting member. The hose may be connected to a vacuum source to more effectively collect debris generated during turning operations. The tubular cutting member could be made in a range of sizes from one quarter inch to two inches in diameter, with a nominal tube length of from three inches to twenty inches, or even larger where needed. Both ends of the tubular cutting member could be sharpened, and reversed in the holder when one end is dull.

20 Claims, 12 Drawing Sheets

NOZZLE/CUTTER SHAPES

CUTTING TOOL AND METHOD OF USE FOR CATCHING CHIPS AND DEBRIS DURING TURNING OPERATIONS

TECHNICAL FIELD

The present invention relates generally to tools, and more particularly to cutting tools for catching chips and debris during tuning operations.

BACKGROUND ART

Lathes are widely used for the manufacture of wood, metal and plastic products. Turning operations, the process of cutting a work piece rotating on a lathe, are performed in a very wide variety of manufacturing processes and industries.

Workpieces on a lathe are usually turned at a very high speed. As a cutting tool cuts the workpiece, debris is thrown from the workpiece. Often, the debris is thrown at a very high speed, endangering the operator, and making the use of safety equipment necessary. The dust generated during the turning operations of certain types of wood, metal, and plastic, often result in a fine dust that is toxic to the operator of the lathe, and requires the use of a hood, dust collection equipment on the lathe, or a respirator.

While turning operations performed in an industrial setting may afford the use of expensive debris and dust collection means, the cost of such of such systems precludes their use in small shops and homes. Often, the operators of small lathes are exposed to toxic dust, flying chips and other hazardous debris.

Furthermore, debris generated during turning operations must be removed from the work area. Although lathes are relatively small tools, the debris generated during turning operations is thrown from the lathe and usually contaminates a large portion of the workshop. In an environment where turning operations are occurring on a continuous basis, the work area must be cleaned frequently to avoid contaminating equipment, hazardous situations, such as fire and hazardous dust contamination of the work area, and to provide for a neat appearance. Such cleaning procedures are costly in time and money.

There is no widely used method of dust collection that is cost effective. Some current systems use compressed air to blow the debris away. Blowing the debris using compressed air is inappropriate in most situations, as it serves to worsen the problems of hazardous dust, debris contamination of the workplace, and time consuming cleaning procedures.

Some current systems use a vacuum hood, which encloses the entire lathe apparatus, or vacuum tool rest to collect debris generated during turning operations. Although such systems are moderately effective, they must be cleaned and are necessarily expensive due to their size and complexity. Furthermore, such systems require constant adjustment and additional activities for continuous use, and make the operation of the lathe much more complex, thereby increasing the cost of operation.

What is needed, therefore, is an apparatus and method to recover debris generated during turning operations. Such an apparatus and method should recover dust, chips and other debris generated during turning operations. The apparatus and method should be inexpensive to acquire, both in time and complexity, and should be available at a cost within reach of the ordinary woodworking consumer. The apparatus and method should solve the problems of debris fouled work spaces and decrease the amount of hazardous dust, thereby providing for a safer, cleaner and less expensive workplace. Such an apparatus and system would clearly be an improvement over the current state of the lathe and turning operations art.

OBJECTS AND ADVANTAGES

The present invention solves the problem of debris generated during turning operations and provides a simple, inexpensive and effective apparatus for and method of dust and debris collection during turning operations. The apparatus and method of the present invention provides for debris collection during turning operations without added expense or equipment to the lathe, or complicated hoods or enclosures. The present invention may be inexpensively added to conventional lathe cutting tools, or new debris collecting cutting tools provided for by the present invention may be manufactured inexpensively.

SUMMARY OF THE INVENTION

A first embodiment of the present invention is a cutting tool for cutting a work piece and catching debris during turning operations including a tubular cutting member having first and second ends, the first end having a sharpened edge, and a debris receiving means connected to the second end. The tubular cutting member may have a number of different cross-sections providing a number of different cutting tool configurations for use in turning operations. The debris receiving means may further include a flexible hose having a first hose end and a second hose end, wherein the first hose end is connected to the second end of said tubular cutting member. The hose may be connected to a vacuum source to more effectively collect debris generated during turning operations. The tubular cutting member could be made in a range of sizes from one quarter inch to two inches in diameter, with a nominal tube length of from three inches to twenty inches, or even larger where needed. Both ends of the tubular cutting member could be sharpened, and reversed in the holder when one end is dull.

In an alternative embodiment, the present invention is a cutting tool for cutting a workpiece and catching debris during turning operations including a tubular member having first and second ends, and a cutting means separate from the tubular member fixedly attached to the first end and a debris receiving means connected to the second end. This tubular member has a diameter of one-half inch to two inches, with a length of tube from four inches to two feet.

In an alternative embodiment, the present invention is a cutting tool for cutting a workpiece and catching debris during turning operations, including a tubular member having first and second ends with a port located midway along the axis of the tubular member with a cutting means inserted through the second end, fixedly attached to the tubular member. The cutting means is provided with a sharpened edge extending past said first end of said tubular cutting member. Further, a debris receiving means fixedly connected to the tubular cutting member, wherein the debris receiving means covers the port. This tubular member would be slightly longer than the shaft of the gouge or chisel cutting means it is used with, and from one-half inch to two inches in diameter.

BRIEF DESCRIPTION OF DRAWINGS

The present invention will be described with reference to the accompanying drawings, wherein:

FIG. 8 further illustrates the embodiment of FIG. 7a;

DETAILED DESCRIPTION OF THE PRESENT INVENTION

Figure 1:
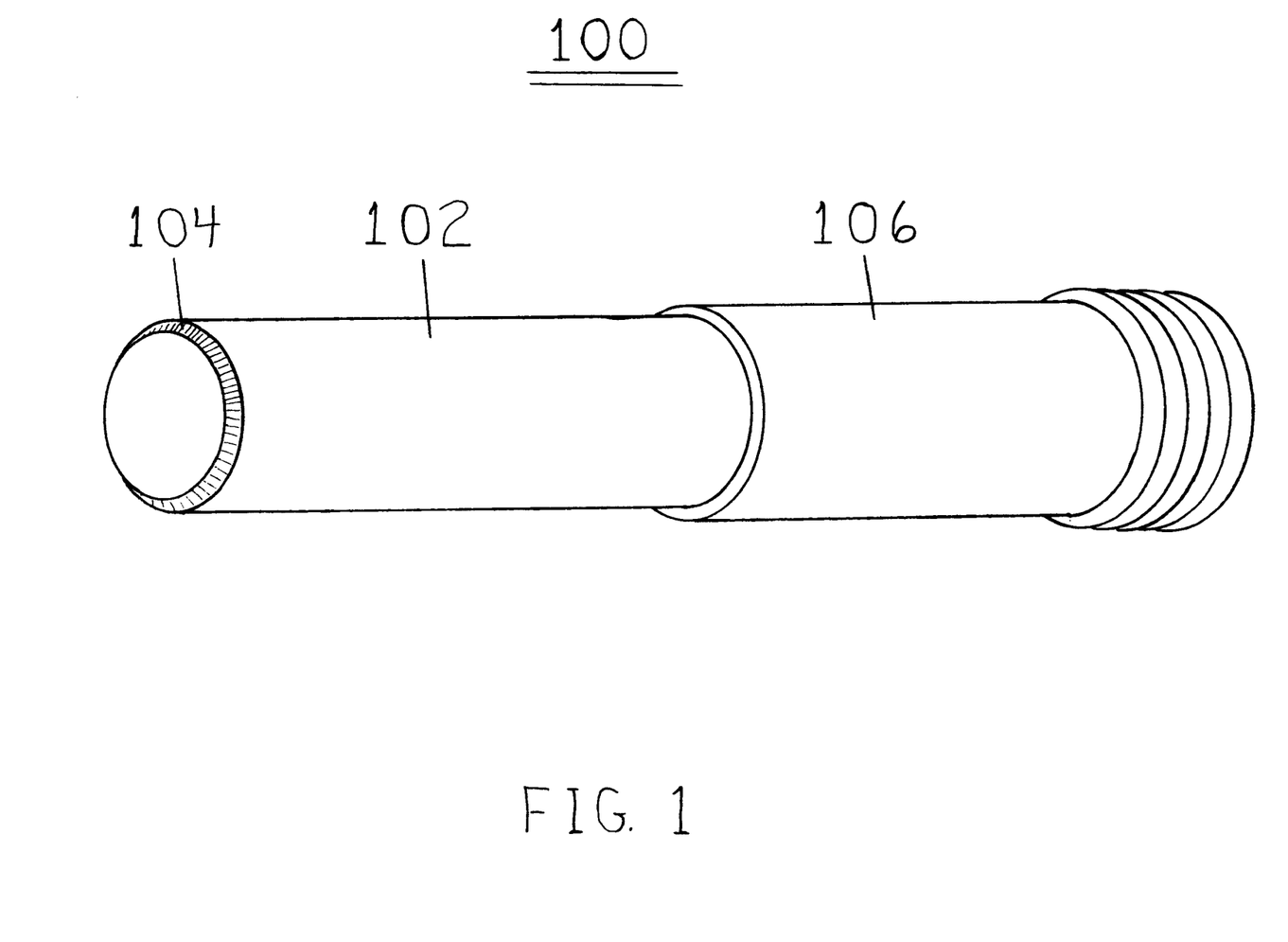
FIG. 1 illustrates a preferred embodiment of the cutting tool of the present invention.

FIG. 1 is a perspective drawing of one preferred embodiment of the present invention. Cutting tool 100 includes a tubular cutting member 102, a cutting tip 104, and debris receiving means 106. Cutting tool 100 is used as a gouge in turning operations, for example roughing down a wooden work piece on a wood lathe. A conventional gouge, or chisel, produces debris as the workpiece, such as a wooden dowel, is turned down on a lathe. Cutting tool 100, on the other hand, receives debris generated during turning operations through cutting tip 104. Tubular cutting member 102 is made of tool steel, or any material appropriate for the fabrication of cutting tools. Debris receiving means 106 may be fabricated and plastic, metal, wood, or any material of sufficient stiffness and strength to permit support of tubular cutting member 102 during turning operations.

Cutting tip 104 is formed by removing material from the end of tubular cutting member 102 to produce a sharp edge. In the embodiment of FIG. 1, cutting tip 104 has been formed by removing material from the outer surface of the first end of tubular cutting member 102. Debris receiving means 106 is attached to the second end of tubular cutting member 102. Debris receiving means 106 may include a hose to direct debris downward into a receptacle, or may include a connection to a vacuum source, such as a canister type vacuum cleaner.

In operation, the user grasps tubular cutting member 102, or tubular cutting member 102 and debris receiving means 106, and rests tubular cutting member 102 against the toolrest of a lathe, or other turning operation apparatus. Cutting tip 104 is brought into contact with the rotating workpiece, thereby removing material from the rotating workpiece in the conventional manner. Debris removed from the work piece, however, is received through cutting tip 104, and is conveyed down tubular cutting member 102. Debris is conveyed down tubular cutting member 102 either by kinetic energy, or by a force applied by a vacuum source attached to debris receiving means 106, such as a vacuum cleaner. Debris generated by cutting tip 104 is collected by receiving means 106, and stored in receiving means 106 or conveyed to another storage device, such as a vacuum cleaner.

An additional advantage of the present invention is increased cutting surface at cutting tip 104. Conventional gouge-type turning tools have cutting tips that are arcs of a circle. Cutting tip 104 of the present invention, however, provides more cutting tip area, and may be used to remove much more material during turning operations before cutting tip 104 needs to be sharpened. The user may rotate tubular cutting member 102 as cutting tip 104 becomes dull at a particular point on the circumference of cutting tip 104, thereby exposing additional sharp cutting surface. Both ends of tubular cutting member 102 may be sharpened, doubling the time between sharpenings.

Figure 2:
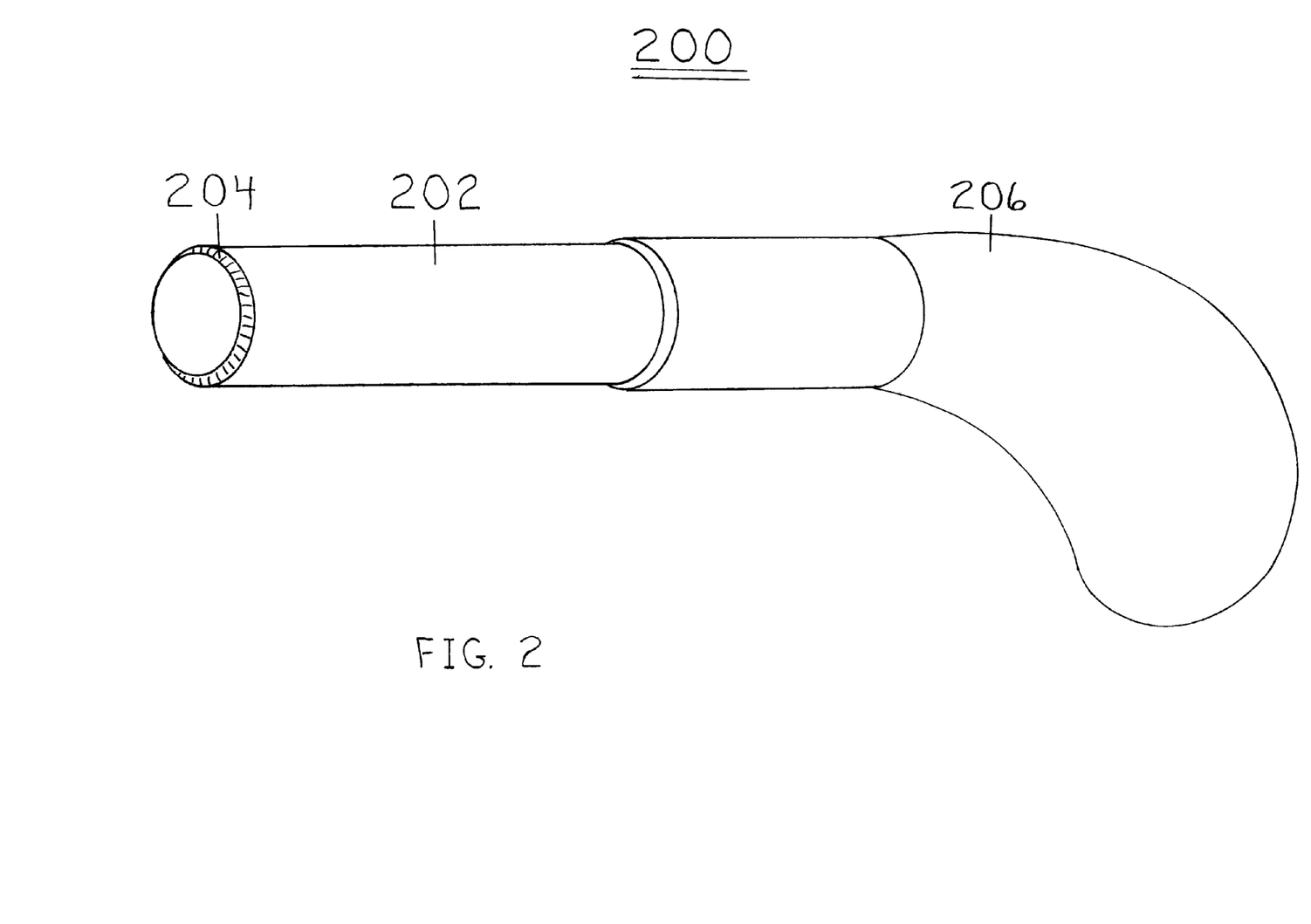
FIG. 2 illustrates an alternative embodiment of the cutting tool of the present invention.

FIG. 2 illustrates an alternative embodiment of cutting tool 100. Cutting tool 200 includes cutting tip 204, tubular cutting member 202 and debris receiving means 206. Cutting tip 204 and tubular cutting member 202 are of the same configuration and construction of those described in conjunction with the cutting tool 100. Debris receiving means 206 may comprise a cloth or plastic bag for receiving the debris generated at cutting tip 204. Debris is generated as described in conjunction with cutting tool 100, and kinetic energy carries the debris from cutting tip 204 to debris receiving means 206.

Figure 3:
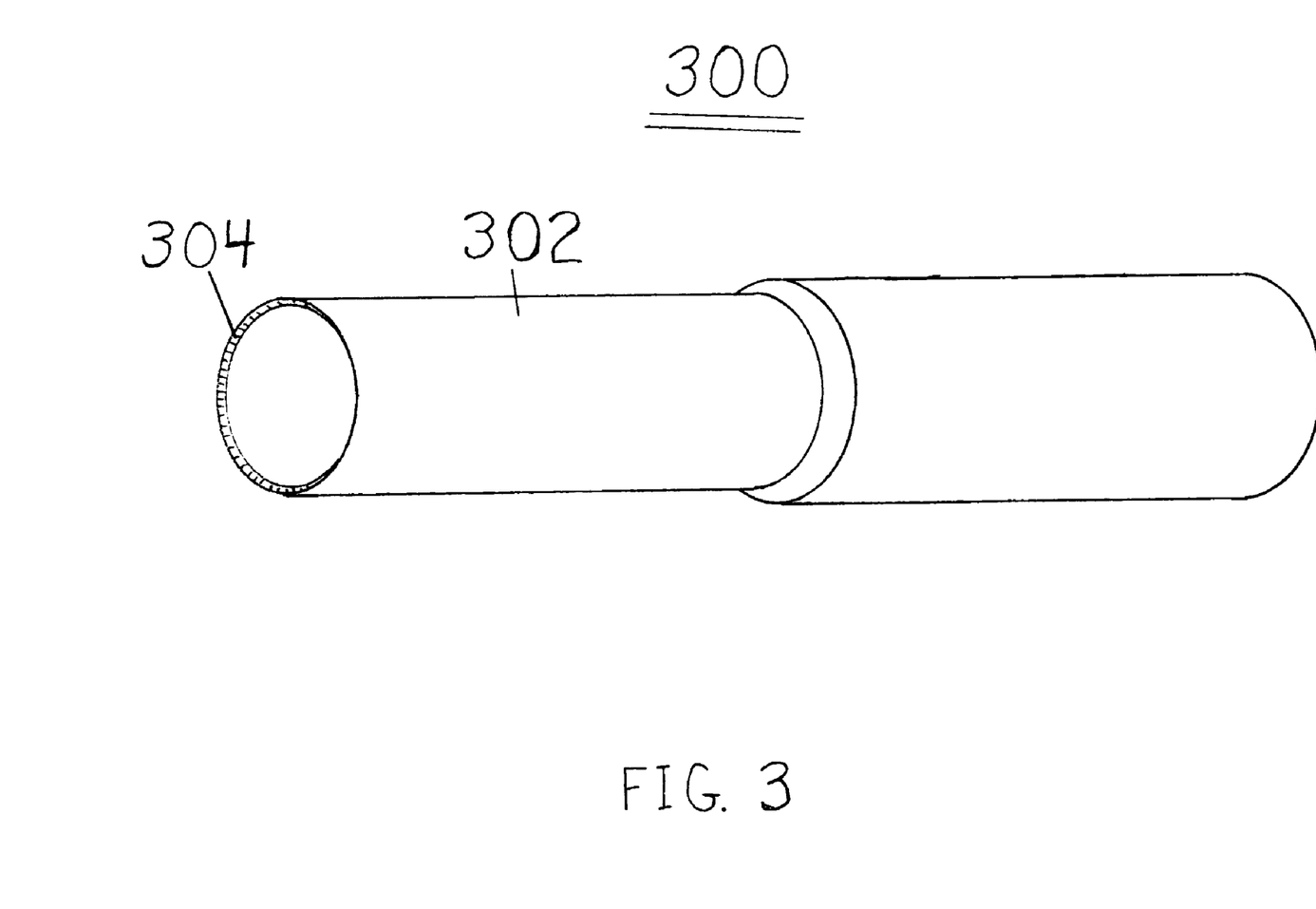
FIG. 3 illustrates an alternative embodiment of the cutting tool of the present invention.

FIG. 3 illustrates an alternative embodiment for cutting tips 104 and 204, namely cutting tip 304. Cutting tip 304 is formed by removing material from the inside surface of tubular cutting member 302 at the end. An example method for forming cutting tip 304 would be to place the end of tubular cutting member 302 over a rotating cone-shaped grinding stone having a base diameter exceeding the diameter of tubular cutting member 302.

Figure 4:
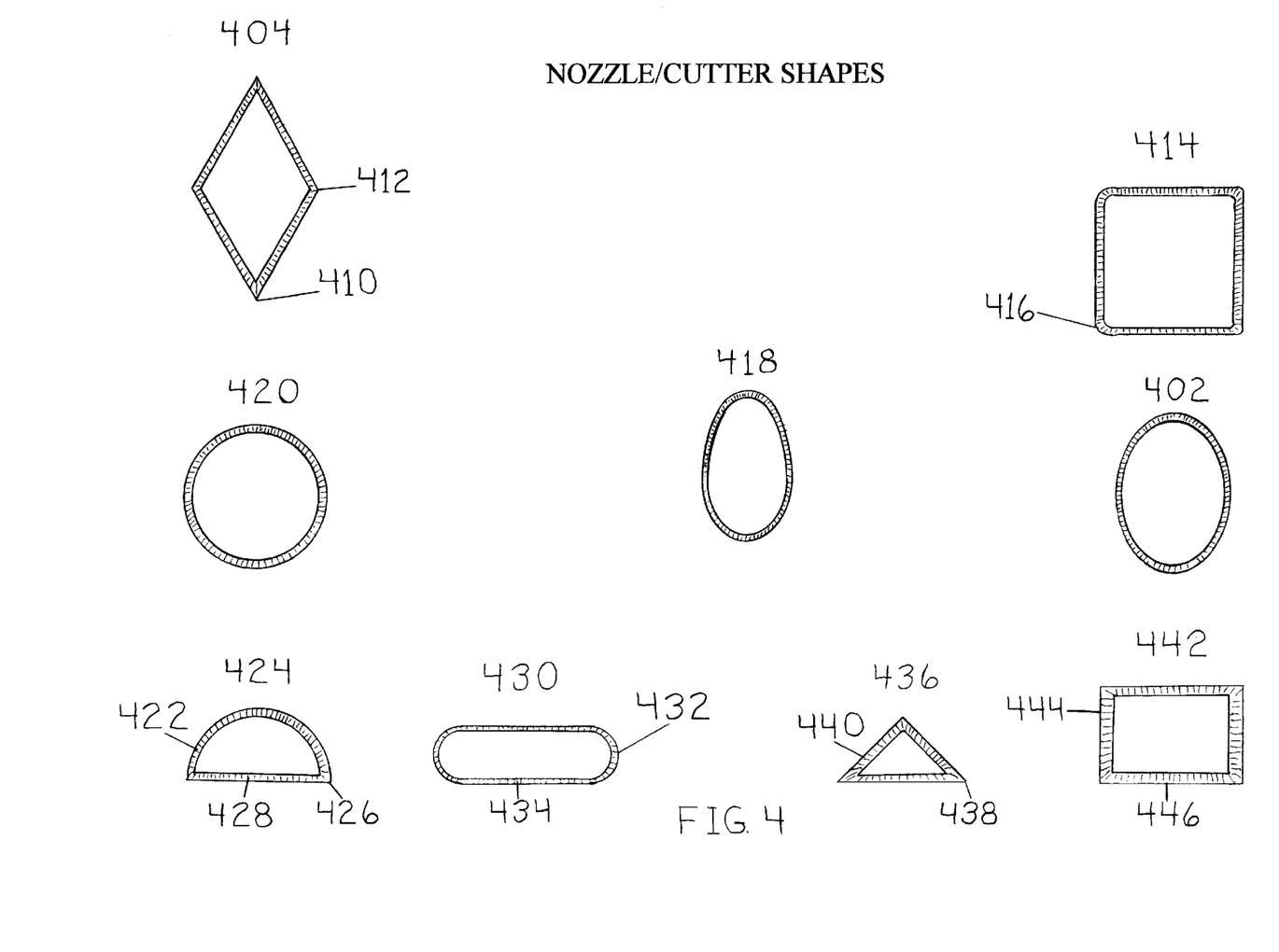
FIG. 4 illustrates alternative cross-section configurations for the tubular cutting member of the present invention.

FIG. 4 illustrates alternative cross-sections for tubular cutting members 102, 202 and 302. Tubular cutting member cross-section 402 illustrates a tubular cutting member having an elliptical cross-section. Tubular cutting member cross-section 404 illustrates a tubular cutting member having a diamond shaped cross-section. The diamond shaped cross-section of tubular cutting member cross-section 404 is especially useful since it provides two different angles of cutting at tips 412 and 410, and four flat cutting surfaces.

Tubular cutting member cross-section 414 illustrates a tubular cutting member with a square cross-section. Tubular cutting member cross-section 414 is particularly useful in that it provides four cutting surfaces, and radiused corners 416. Each of the cutting surfaces of a tubular cutting member cross-section 414 may be used before the tubular cutting member must be resharpened.

Tubular cutting member cross-section 418 illustrates a tubular cutting member with an ovoid cross-section. Tubular cutting member cross-section 420 illustrates a tubular cutting member with a round cross-section. The round cross-section enables the user to rotate the tool, thereby using a continuous sharp edge and continuing to cut the work piece without resharpening the tool.

Tubular cutting member cross-section 424 illustrates a tubular cutting member with a semicircular cross-section. Tubular cutting member cross-section 424 provides a tool with both flat cutting surface 428 and round cutting surface 422, thereby providing two cutting tools in one. Further, the user may use corner cutting surface 426 to cut grooves with opposing flat and radiused sides.

Tubular cutting member cross-section 430 illustrates a tubular cutting member with an oval cross-section. The oval cross-section of tubular cutting member 430 provides the tool with both flat cutting surface 434, wherein flat cutting surface 434 has radiused sides, and round cutting surfaces 432. The user of the cutting tool of the present invention with tubular cutting member cross-section 430 may use either the flat cutting edge 434 or rounded cutting edge 432 alone or in combination with the other. Additionally, tubular cutting member cross-section 430 allows the tool to be used twice as long as a conventional single-sided cutting tool.

Tubular cutting member cross-section 436 illustrates a tubular cutting member with a triangular cross-section. Tubular cutting member cross-section 436 provides the tool with 3 flat cutting surfaces, such as flat cutting surface 440. The three flat cutting surfaces provide the tubular cutting member with three times the number of cutting surfaces of a chisel type or single sided cutting tools. The three flat surfaces of tubular cutting member cross-section 436 enable the tubular cutting member to include three different width cutting surfaces in the same tool if, for example, all three sides of tubular cutting member cross-section 436 are of different lengths.

Furthermore, tubular cutting member cross-section 436 provides the tubular cutting member with 3 angular cutting corners 438. Angular cutting corners 438 provide a means for cutting angular grooves in a rotating workpiece. Corners 438 provide three times as many cutting corners as a similarly configured conventional cutting tool.

Tubular cutting member cross-section 442 illustrates a tubular cutting member with a rectangular cross-section. Tubular cutting member cross-section 442 provides the tubular cutting member with four flat cutting surfaces, such as flat cutting surfaces 444 and 446. Flat cutting surfaces 444 and 446 provide the tubular cutting member with four times the number of cutting surfaces of normal flat or single-sided cutting tools. The four flat surfaces of tubular cutting member cross-section 436 enable the tubular cutting member to include two different width cutting surfaces, effectively providing two separate width cutting tools.

Figure 5:
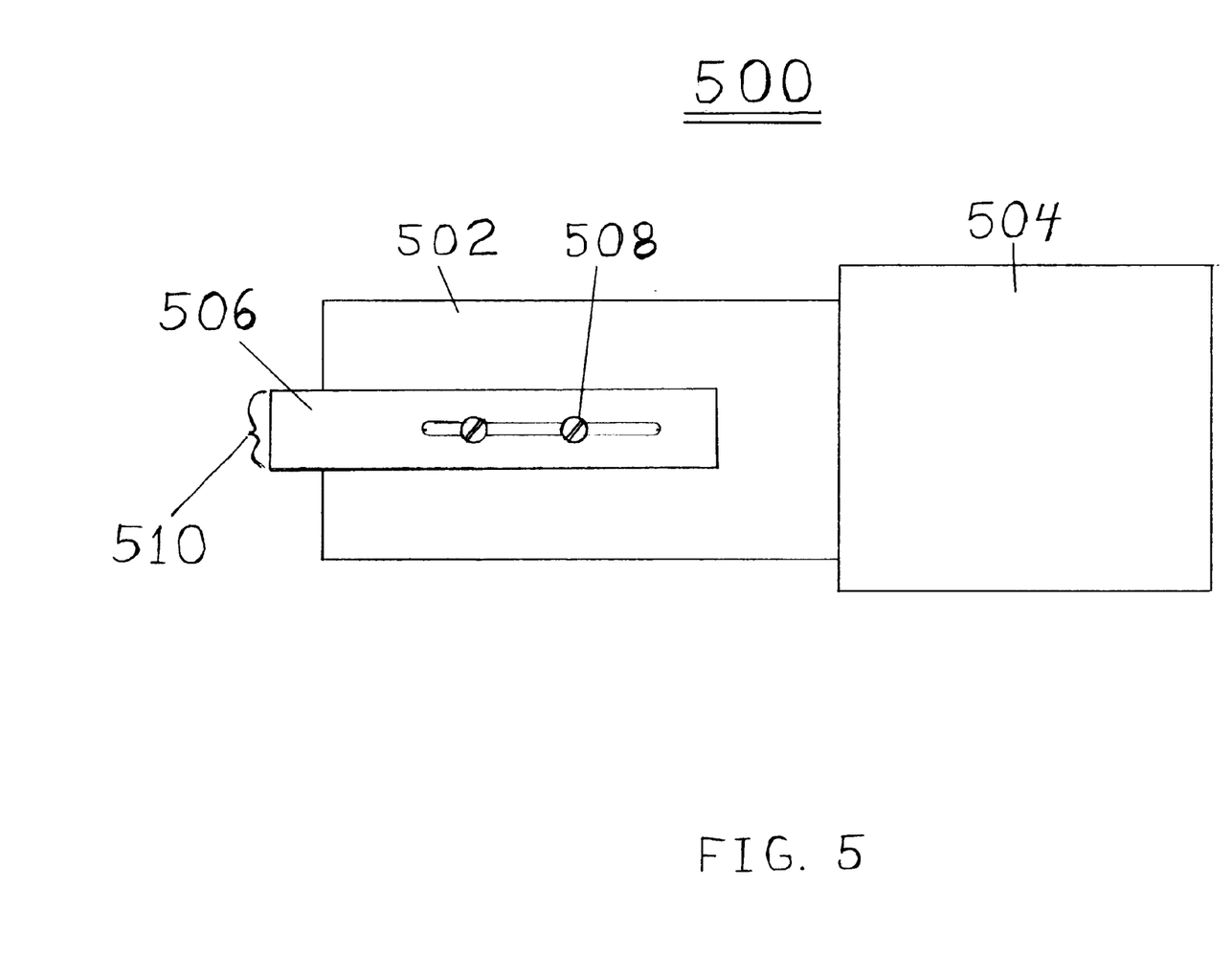
FIG. 5 illustrates an alternative embodiment of the present invention having a removably connected cutting tool.

FIG. 5 illustrates an alternative embodiment 500 of the present invention. The embodiment of FIG. 5 provides a cutting tool 500 with a replaceable cutting blade 506 which may be changed for a sharper cutting blade, or a cutting blade of a different configuration. Replaceable cutting blade 506 is attached to tubular member 502. Tubular member 502 is of the same configuration as the tubular members of FIGS. 1–3, except that tubular member 502 need not be sharpened for cutting tool 500 to be operational. Debris receiving means 504 of cutting tool 500 is illustrated as vacuum hose 504. A vacuum source, such as a vacuum cleaner, or the like, is attached to debris receiving means 504 in order to remove debris generated as a result of turning operations.

Cutting tool 500 has a separately attachable cutting blade 506. Tubular member 502 is provided with screw holes through which screws 508 pass. Cutting blade 506 is disposed between the heads of screws 508 and tubular member 502. In the preferred embodiment, cutting blade 506 is provided with a slot, or plurality of slots for receiving screws 508. The slots are formed in such a way as to accept stove bolt type screws, thereby providing a flush, flat surface on the bottom of cutting blade 506, and providing unimpeded use on a lathe toolrest. Cutting Tip 510 of cutting blade 506 extends beyond the end of tubular member 502.

Figure 6:
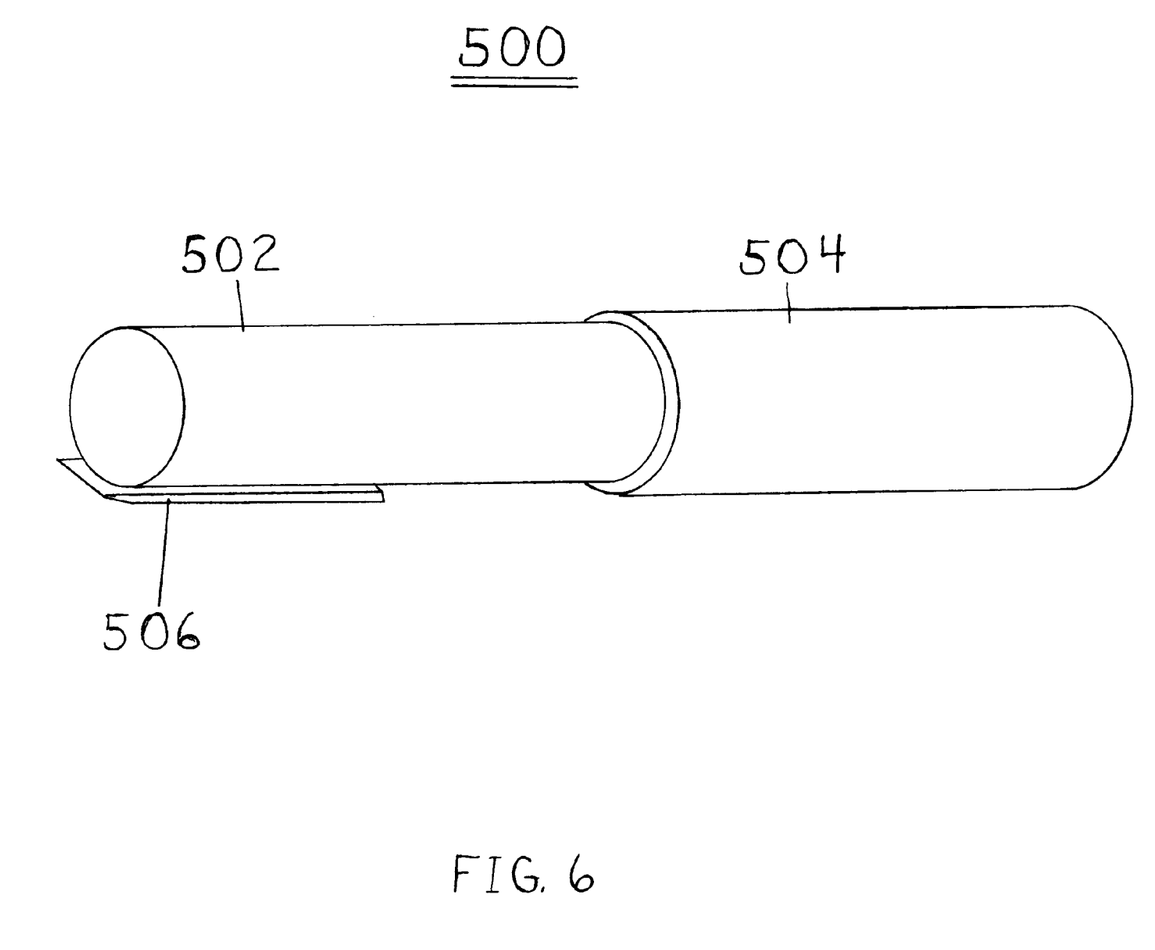
FIG. 6 further illustrates the alternative embodiment having a removably connected cutting tool.

FIG. 6 is a perspective drawing of alternative embodiment 500 of the present invention. FIG. 6 shows tubular cutting member 502 in relation to cutting blade 506 and debris receiving means 504, shown in FIG. 6 as a vacuum hose.

Figure 7A:
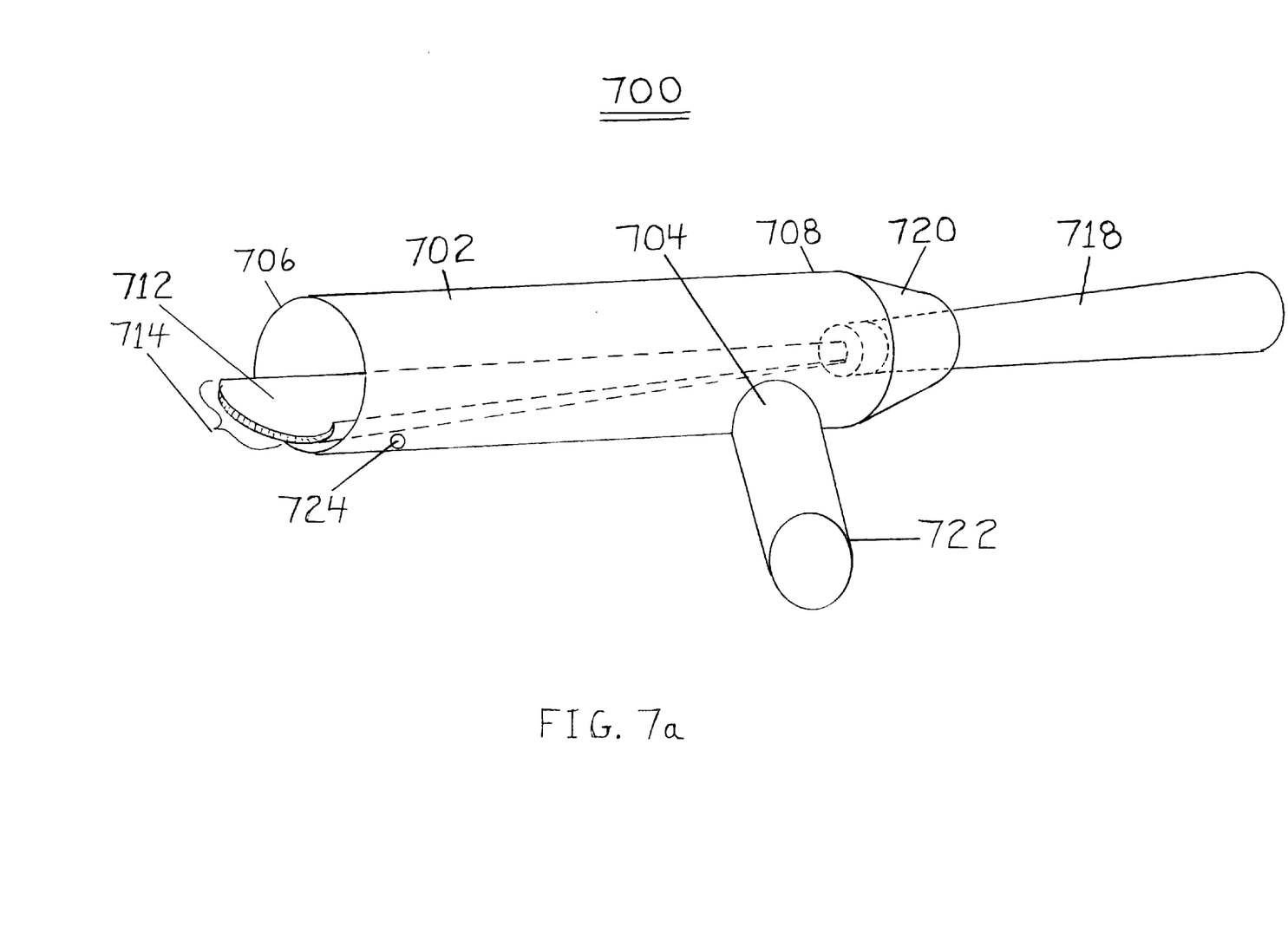
FIG. 7a illustrates an alternative embodiment of the present invention.

FIG. 7a illustrates an alternative embodiment of the present invention. Cutting tool 700 comprises a turning tool 712 and a separate, surrounding nozzle tube 702, or tubular member, that serves in the function of debris collection. One advantage of the embodiment of FIG. 7a is that the present invention can be made and used with existing turning tools, such as conventional chisels and gouges, with a single debris collection attachment.

Cutting tool 700 includes a chisel or gouge type turning tool 712 inserted into a nozzle tube 702. Chisel blade of turning tool 712 is inserted through nozzle tube end 708. Cutting tip 714 of chisel blade of turning tool 712 extends past nozzle tube end 706 at nozzle tube tip 706. Nozzle tube end 708 is provided with an elastic, rubber, or similar, seal 720 to provide an air-tight or semi-air-tight seal between turning tool handle 718 and nozzle tube end 708.

Nozzle tube 702 is provided with port 704. Port 704 is disposed part way down the length of nozzle tube 702. Port 704 provides a means for debris captured within nozzle tube 702 during turning operations to be carried from within nozzle tube 702 to debris receiving means 722. Debris receiving means 722 is fixedly attached to nozzle tube 702, and covers port 704. Debris receiving means 722 of the embodiment shown in FIG. 7a is preferably a hollow tube fixedly connected to nozzle tube 702. In the preferred embodiment, a vacuum source, such as a canister-type vacuum cleaner, is attached to debris receiving means 722. When the cutting tool of FIG. 7a is used during turning operations, debris is generated at the workpiece. The debris enters nozzle tube tip 706, and is carried to port 704, and received by debris receiving means 722. The debris may be carried from debris receiving means to the vacuum source for storage, or merely collected at debris receiving means 722. Nozzle tube 702 is provided with a small hole 724. Small holes 724 may be used to strap during tool 712 nozzle tube 702.

Figure 7B:
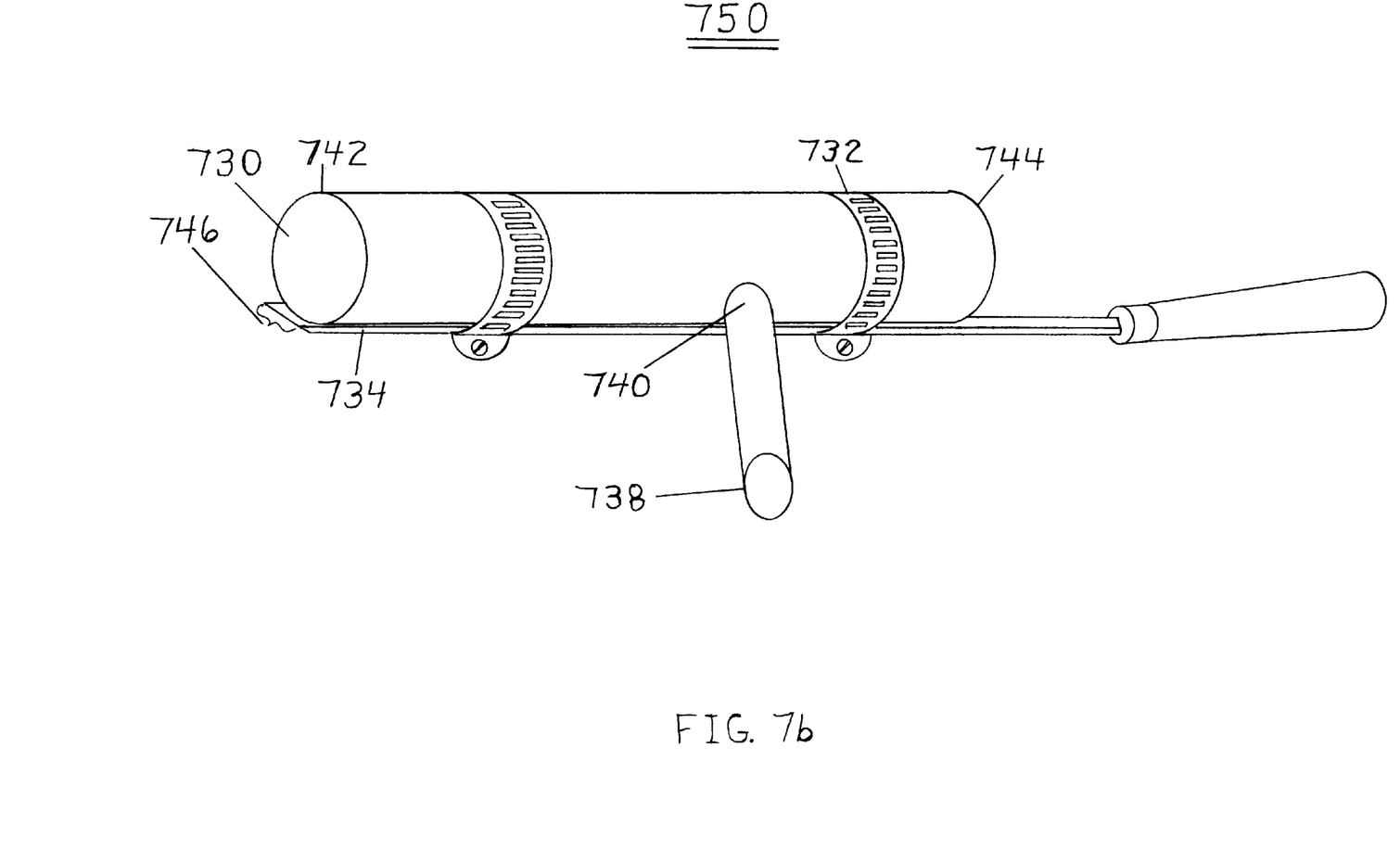
FIG. 7b illustrates an alternative embodiment of the present invention.

FIG. 7b illustrates an alternative embodiment of the present invention. Cutting tool 750 comprises a turning tool 734 and a separate, external nozzle tube 730, or tubular member, that serves the function of debris collection. One advantage of the embodiment of FIG. 7b is that the present invention may be constructed and practiced using existing turning tools, such as conventional chisels and gouges, with a single debris collection attachment.

Cutting tool 750 includes a chisel-type turning tool 734 clamped onto nozzle tube 702. Chisel blade of turning tool 734 is fixedly attached to nozzle tube 730 with adjustable band clamps 732. Cutting tip 746 of chisel blade of turning tool 734 extends past nozzle tube end 742 so that it may engage a workpiece during turning operations. While nozzle tube end 742 is open to receive debris generated during turning operations, nozzle tube end 744 is provided with an end cap so that nozzle tube 730 is provided with a single open end.

Nozzle tube 730 is provided with port 740. Port 740 is disposed part way down the length of nozzle tube 730. Port 740 provides a means for debris captured within nozzle tube 730 during turning operations to be carried from within nozzle tube 730 to debris receiving means 738. Debris receiving means 738 is fixedly attached to nozzle tube 730, and covers port 740. Debris receiving means 738 of the embodiment shown in FIG. 7b is preferably a hollow tube fixedly connected to nozzle tube 730. In the preferred embodiment, a vacuum source, such as a canister-type vacuum cleaner, is attached to debris receiving means 738. When the cutting tool of FIG. 7b is used during turning operations, debris is generated at the workpiece. The debris enters nozzle tube tip 742, and is carried to port 740, and received by debris receiving means 738. The debris may be carried from debris receiving means to the vacuum source for storage, or merely collected at debris receiving means 738. Although turning tool 734 is shown as a flat-type chisel, in practice, gouges and other configurations of turning tools may be used with nozzle tube 730.

Figure 8:
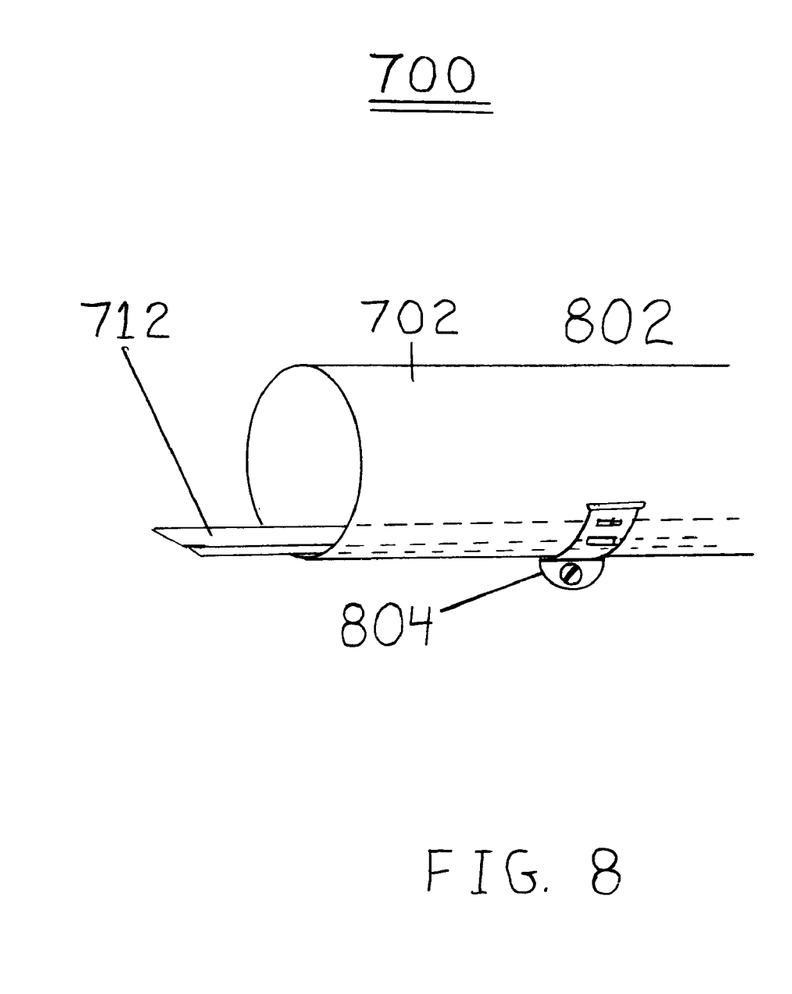

FIG. 8 illustrates the elements used to secure turning tool 712 to nozzle tube 702. Turning tool 712 is secured to nozzle tube 702 by means of an adjustable band clamp 804, such as a hose clamp inserted through axial slits 802 in nozzle tube 702, thereby clamping turning tool 712 to nozzle tube 702. The adjustable band clamp and axial slits are omitted in FIG. 7a for the purposes of clarity, but are clearly illustrated in FIG. 8. A friction material, such as rubber, may be interposed between turning tool 712 and nozzle tube 702 or between adjustable band clamp 804 and turning tool 712 in order to secure turning tool 712 to nozzle tube 702.

Figure 9:
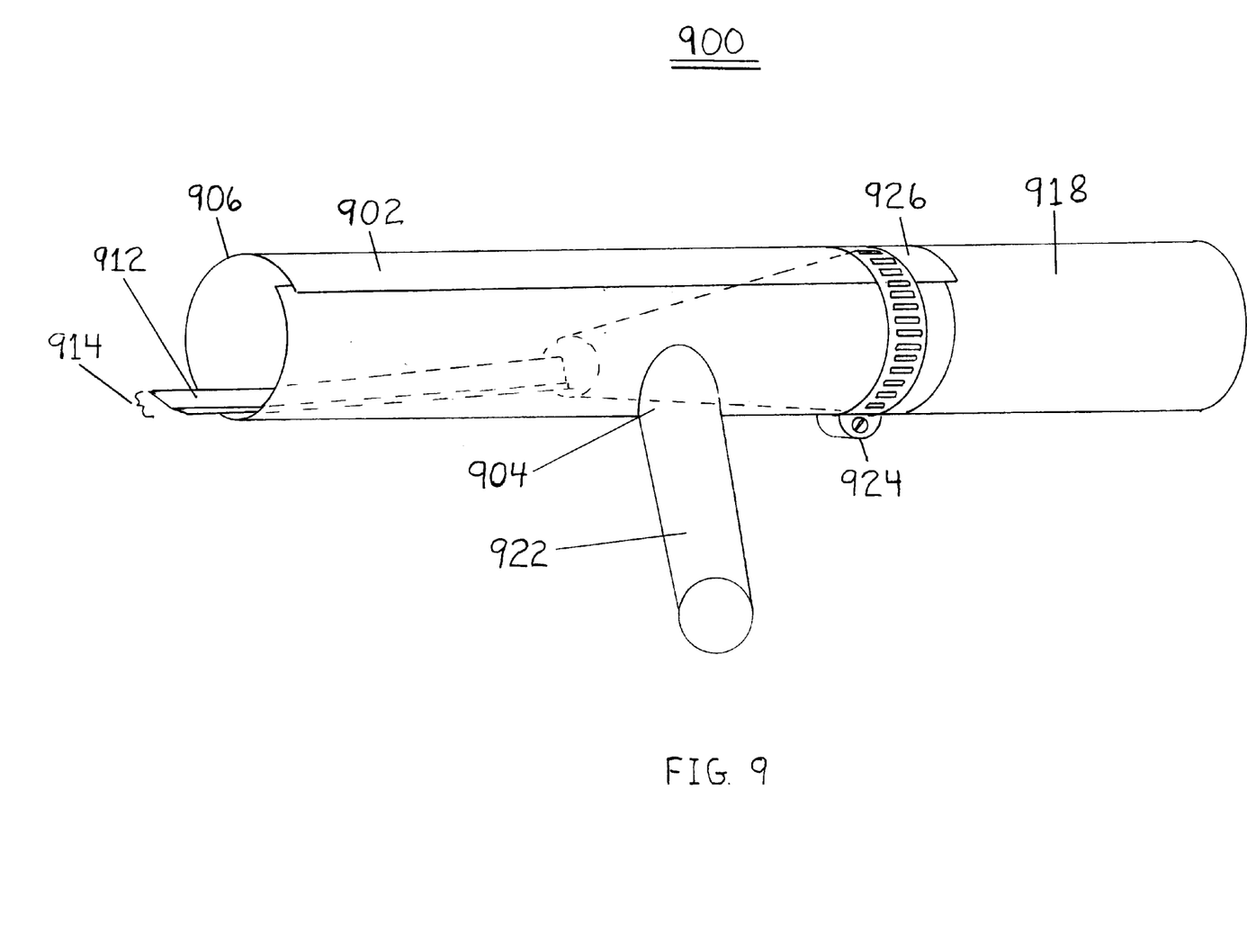
FIG. 9 illustrates an alternative embodiment of the present invention including a flexible sheet rolled into a tubular member for receiving debris generated during turning operations and a removable chisel type turning tool.

FIG. 9 illustrates an alternative embodiment 900 of the present invention. Cutting tool 900 includes a chisel or gouge type turning tool 912 inserted into nozzle tube 902. Nozzle tube 902 is constructed of a flexible sheet rolled into a tubular member, or nozzle tube 926. The flexible material of nozzle tube 926 may be plastic, metal, wood, or other flexible material that can be rolled into a tube configuration wall maintaining some rigidity. Chisel blade of turning tool 912 is inserted through nozzle tube end 908. Cutting tip 914 of chisel blade of turning tool 912 extends past nozzle tube end 906 at nozzle tube tip 906.

Nozzle tube 926 is secured to chisel tool 912 by means of an adjustable band clamp 924, such as a hose clamp, which is disposed circumferentially on an overlap of nozzle tube 926 and turning tool handle 918. When tightened, hose clamp 924 secures the flexible rolled tube to turning tool 912.

Nozzle tube 902 is provided with port 904. Port 904 is disposed part way down the length of nozzle tube 902. Port 904 provides a means for debris captured within nozzle tube 902 during turning operations to be carried from within nozzle tube 902 to debris receiving means 922. Debris receiving means 922 is fixedly attached to nozzle tube 902, and covers port 904. Debris receiving means 922 of the embodiment shown in FIG. 9 is preferably a hollow tube fixedly connected to nozzle tube 902. In the preferred embodiment, a vacuum source, such as a canister-type vacuum cleaner, is attached to debris receiving means 922. When the cutting tool of FIG. 9 is used during turning operations, debris is generated at the workpiece. The debris enters tip of nozzle tube tip 906, and is carried to port 904, and received by debris receiving means 922. The debris may be carried from debris receiving means to the vacuum source for storage, or merely collected at debris receiving means 922.

Figure 10:
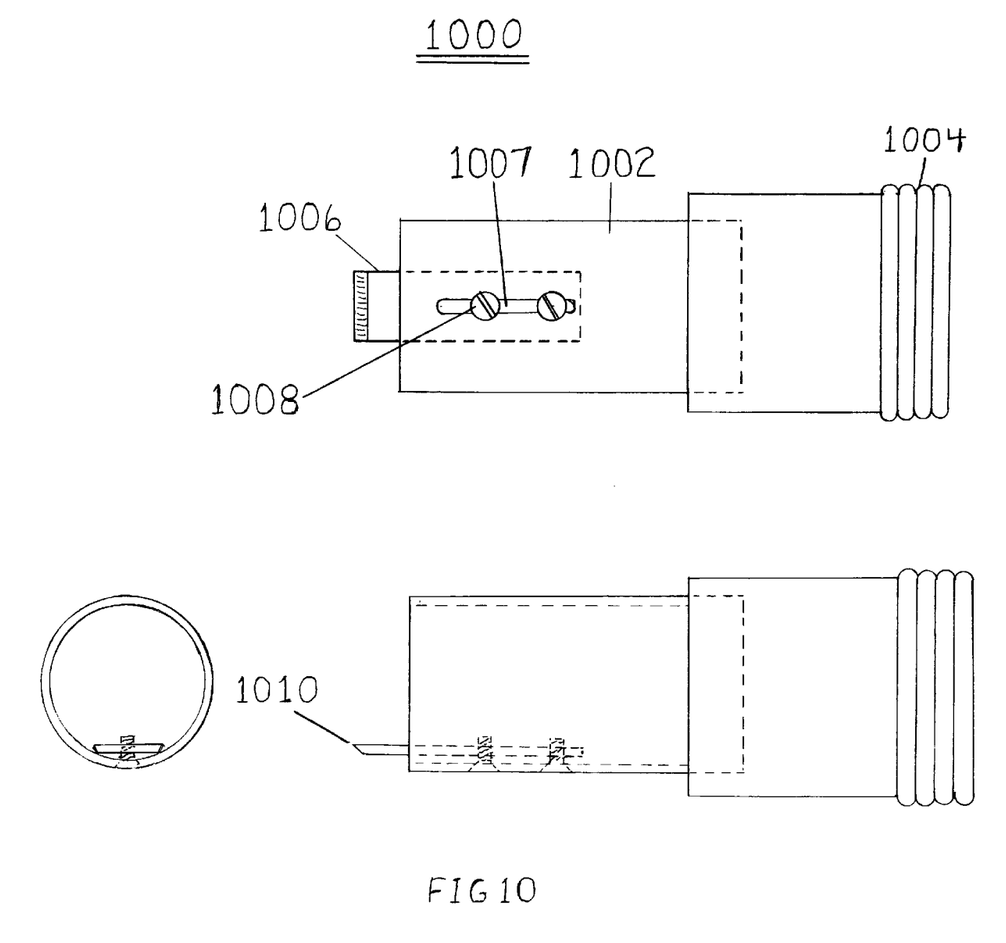
FIG. 10 illustrates an alternative embodiment of the present invention having a removable cutting tool.

FIG. 10 illustrates a bottom view, side view, and front view of an alternative embodiment of the present invention, cutting tool 1000. Cutting tool 1000 includes a separately attachable cutting blade 1006 internally disposed within tubular member 1002. The embodiment of FIG. 10 provides cutting tool 1000 with replaceable cutting blade 1006 which may be changed for a sharper cutting blade, or a cutting blade of a different configuration. Debris receiving means 1004 of cutting tool 1000 is illustrated as vacuum hose 1004. A vacuum source, such as a vacuum cleaner, or the like, may be attached to debris receiving means 1004 in order to facilitate the removal of debris during turning operations.

Cutting tool 1000 has a separately attachable cutting blade 1006. Tubular member 1002 is provided with slots 1007 through which screws 1008 pass. Cutting blade 1006 is disposed inside tubular member 1002, and is held in place by screws 1008. In the embodiment of FIG. 10, cutting blade 1006 is provided with threaded screw holes 1009 for receiving screws 1008. Slots 1007 on tubular member 1002 are in a recessed area of tubular member 1002, thereby providing a flush, flat surface on the bottom of tubular member 1002, and provide unimpeded use of cutting tool 1000 on a lathe toolrest. Cutting tip 1010 of cutting blade 1006 extends beyond the first end of tubular member 1002.

Figure 11:
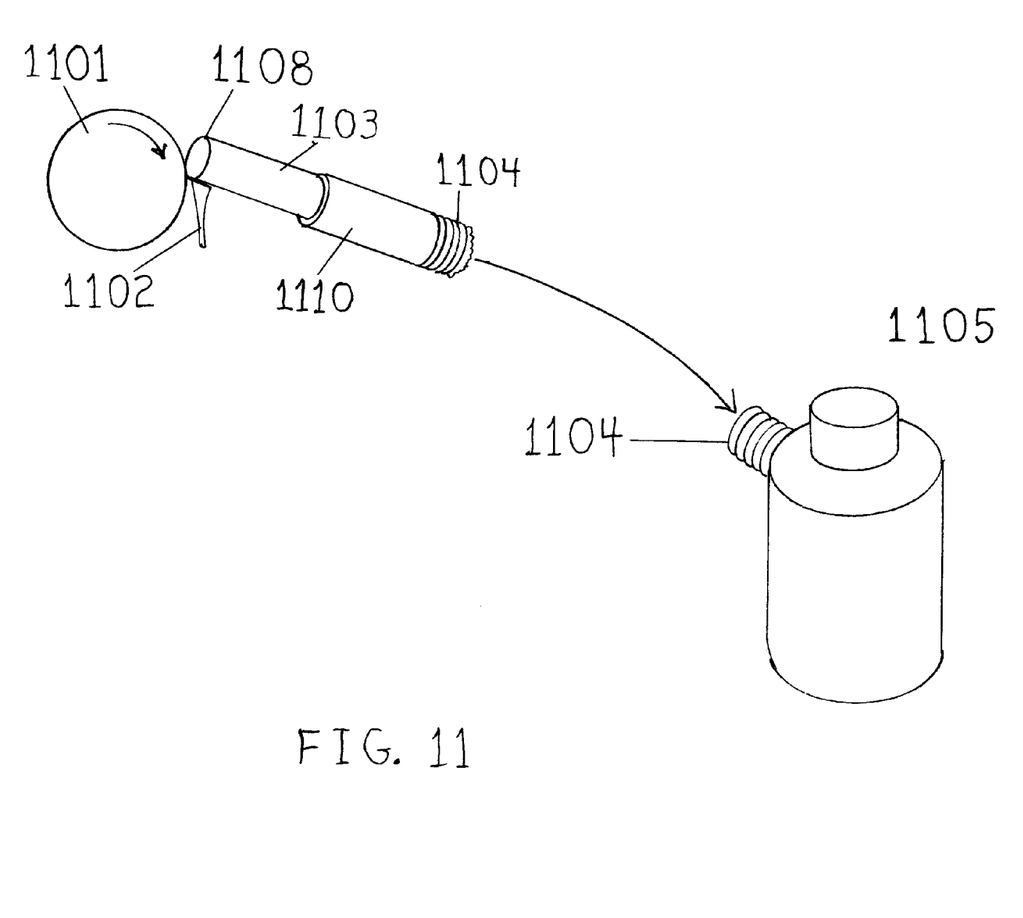
FIG. 11 illustrates an exemplary environment and method of use for the present invention.

FIG. 11 illustrates the cutting tool of the present invention in use during operations. Cutting tool 1103 is normally handheld, and used in the same manner as conventional turning tools, such as chisels and gouges. Cutting tip 1108 is brought into contact with rotating workpiece 1101. The user of grasps tubular cutting member 1103 and debris receiving means 1110. The user controls the cutting tool by placing cutting tool 1103 against toolrest 1102 and placing one hand on cutting tool 1103 so that sharpened edge 1108 engages rotating workpiece 1101, thereby removing material from workpiece 1101 in the usual manner. The other hand would grasp tubular member 1103 lightly, about six inches or more from cutting tip 1108. The top edge of workpiece 1101 is viewed by the user when turning, so that cutting tool 1103 does not impede viewing the work.

When cutting tool 1103 is used to remove material from workpiece 1101 on the lathe, the dust and chips enter cutting tip 1108, even without a vacuum source attached to debris receiving means 1110. FIG. 11 illustrates the use of a canister type vacuum cleaner 1105 to provide vacuum to vacuum hose 1104, which in turn is connected to debris receiving means 1110. During operation, debris generated at cutting tip 1108 enters tubular cutting member 1103. Vacuum, created by canister vacuum cleaner 1105, draws the debris into debris receiving means 1110 and down vacuum cleaner hose 1104. The debris are drawn down vacuum cleaner hose 1104 and received by canister type vacuum cleaner 1105. The debris are collected inside canister type vacuum cleaner 1105. The alternative embodiments of the present invention are used in a similar manner, by bringing the cutting tip into contact with the rotating workpiece on the lathe.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A hand held cutting tool for cutting a rotating workpiece and catching debris during turning operations, comprising:

a tubular cutting member having first and second ends; said first end having a sharpened edge; and a debris receiving means connected to said second end.

2. The hand held cutting tool of claim 1, wherein said tubular cutting member has a circular cross-section.

3. The hand held cutting tool of claim 1, wherein said tubular cutting member has a polygonal cross-section.

4. The hand held cutting tool of claim 1, wherein said tubular cutting member has an ovoid cross-section.

5. The hand held cutting tool of claim 1, wherein said debris receiving means further comprises:

a flexible hose having a first hose end and a second hose end;

wherein said first hose end is connected to said second end of said tubular cutting member.

6. The hand held cutting tool of claim 5, wherein said second hose end is connected to a vacuum source.

7. The hand held cutting tool of claim 1, wherein said debris receiving means comprises a fabric bag.

8. A hand held cutting tool for cutting a work piece and catching debris during turning operations, comprising:
   a tubular member having first and second ends;
   a cutting means separate from said tubular member and fixedly attached to said first end; and
   a debris receiving means connected to said second end.

9. The hand held cutting tool of claim 8, wherein said debris receiving means further comprises:
   a flexible hose having a first hose end and a second hose end; and
   wherein said first hose end is connected to said second end of said tubular member.

10. The hand held cutting tool of claim 9, wherein said second hose end is connected to a vacuum source.

11. The hand held cutting tool of claim 8, wherein said debris receiving means comprises a fabric bag.

12. A hand held cutting tool for cutting a work piece and catching debris during turning operations, comprising
   a tubular member having first and second ends;
   said tubular member having a port located on the surface of said tubular member;
   a cutting means fixedly attached to said tubular member;
   said cutting means having a sharpened edge extending past said first end of said tubular member; and
   a debris receiving means fixedly connected to said tubular member;
   wherein said debris receiving means covers said port.

13. The hand held cutting tool of claim 12, wherein said debris receiving means further comprises:
   a flexible hose having a first hose end and a second hose end;
   wherein said first hose end is connected to said port on said tubular member.

14. The hand held cutting tool of claim 13, wherein said second hose end is connected to a vacuum source.

15. A cutting tool for cutting a workpiece and catching debris during turning operations, comprising:
   a flexible sheet, rolled to form a tubular member having first and second ends;
   a port located on the surface of said tubular member;
   a cutting means inserted through said second end, and fixedly attached to said tubular member;
   said cutting means having a sharpened edge extending past said first end of said tubular cutting member; and
   a debris receiving means fixedly connected to tubular cutting member;
   wherein said debris receiving means covers said port.

16. The cutting tool of claim 15, wherein said debris receiving means further comprises:
   a flexible hose having a first hose end and a second hose end; and
   wherein said first hose end is connected to said port.

17. The cutting tool of claim 16, wherein said second hose end is connected to a vacuum source.

18. The cutting tool of claim 15, wherein said debris receiving means further comprises a fabric bag.

19. A method for using a cutting tool for cutting a rotating work piece and catching debris during turning operations, comprising the steps of:
   grasping a tubular cutting member having first and second ends, wherein said first end has a sharpened edge and said second end is fixedly connected to a debris receiving means;
   applying said first end to the rotating work piece, thereby causing debris to be removed from the work piece;
   catching the debris generated by said first end in said tubular cutting member; and
   transferring the debris caught in said tubular cutting member to said debris receiving means.

20. The method for using a cutting tool of claim 19, further comprising the step of applying a vacuum source to said debris receiving means.

* * * * *